(12) United States Patent
Li et al.

(10) Patent No.: US 10,615,918 B2
(45) Date of Patent: Apr. 7, 2020

(54) MULTIUSER BLOCK ACKNOWLEDGMENT REQUEST

(71) Applicant: Apple Inc., Cupertino, CA (US)

(72) Inventors: Guoqing Li, Cupertino, CA (US); Yong Liu, Cupertino, CA (US); Joonsuk Kim, Saratoga, CA (US); Chiu Ngok E. Wong, San Jose, CA (US); Christiaan A. Hartman, Cupertino, CA (US); Su Khiong Yong, Palo Alto, CA (US); Syed A. Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 16 days.

(21) Appl. No.: 15/203,646

(22) Filed: Jul. 6, 2016

(65) Prior Publication Data

US 2017/0012756 A1    Jan. 12, 2017

Related U.S. Application Data

(60) Provisional application No. 62/188,898, filed on Jul. 6, 2015.

(51) Int. Cl.
  *H04L 1/18*    (2006.01)
(52) U.S. Cl.
  CPC .................... *H04L 1/18* (2013.01)
(58) Field of Classification Search
  None
  See application file for complete search history.

(56) References Cited

U.S. PATENT DOCUMENTS

| | | | |
|---|---|---|---|
| 2008/0212612 A1* | 9/2008 | Singh | H04L 1/1614 370/474 |
| 2011/0096710 A1* | 4/2011 | Liu | H04L 1/1614 370/312 |
| 2013/0227371 A1* | 8/2013 | Asterjadhi | H04L 1/1614 714/748 |
| 2016/0080115 A1* | 3/2016 | Josiam | H04L 5/0094 370/329 |
| 2016/0285608 A1* | 9/2016 | Kwon | H04L 5/0055 |
| 2016/0302229 A1* | 10/2016 | Hedayat | H04B 7/0452 |
| 2016/0330714 A1* | 11/2016 | Hedayat | H04W 72/1289 |
| 2016/0360509 A1* | 12/2016 | Seok | H04L 45/74 |
| 2017/0280358 A1* | 9/2017 | Ma | H04L 1/1685 |

\* cited by examiner

*Primary Examiner* — Chirag G Shah
*Assistant Examiner* — Srinivasa R Reddivalam
(74) *Attorney, Agent, or Firm* — Sterne, Kessler, Goldstein & Fox P.L.L.C.

(57) ABSTRACT

Disclosed herein are system, method, and computer program product embodiments for performing multiuser block acknowledgement in a wireless communication protocol. Embodiments include receiving a control frame from an access point (AP). A transmission mode can be determined based on a trigger information field in the control frame. Further, a data frame to acknowledge can be determined based on a block acknowledgement request (BAR) field in the control frame. A block acknowledgment (BA) frame can be generated based on the data frame to acknowledge. The BA frame can then be transmitted to the AP based on the transmission mode, e.g., at the same time another BA frame is transmitted to the AP by another station.

18 Claims, 7 Drawing Sheets

MULTIUSER BLOCK ACKNOWLEDGMENT REQUEST

BACKGROUND

Technical Field

The disclosed embodiments relate to the field of wireless communications, including multiuser block acknowledgment in wireless communications.

Background

A wireless communication protocol may be a contention-based protocol. For example, the Institute of Electrical and Electronics Engineers (IEEE) 802.11 set of wireless communication protocols are contention-based protocols. A contention-based protocol allows many stations (e.g., users) to use the same channel without pre-coordination. In a contention-based protocol, a station checks that no other station is using the channel. If another station is using the channel, the station waits until the channel is free.

A contention-based wireless communication protocol may perform block acknowledgment. In block acknowledgement, an access point (AP) requests an acknowledgement of one or more frames from a station. Specifically, the AP sends a block acknowledgement request (BAR) frame to the station. In response, the station sends a block acknowledgement (BA) frame to the AP that acknowledges whether the one or more frames were successfully received. Because multiple frames can be acknowledged in a single BA frame, block acknowledgment often improves reliability and media access control (MAC) efficiency for a wireless communication protocol.

However, because a station may need to wait to access the channel in a contention-based wireless communication protocol, the station may be slow to send a BA frame to the AP. This increases power usage because the station repeatedly polls the channel to check that no other station is using it. This also decreases the data transmission rate and increases latency. Finally, there may be increased network congestion because multiple stations are forced to send BA frames one after the other to the AP.

A contention-based wireless communication may allow multiple BA frames to be included in a single frame. For example, a proposal for the IEEE 802.11ax standard allows multiple BA frames to be included in a single multiuser physical layer convergence physical layer protocol data unit (MU-PPDU). Specifically, a multi-station block acknowledgment (M-BA) frame enables an access point to send multiple BA frames in one downlink (DL) frame in response to an uplink (UL) frame, e.g., an UL MU-PPDU frame.

SUMMARY

According to some embodiments, a Multiuser Block Acknowledgement Request (MU-BAR) frame is used to perform multiuser block acknowledgment in one uplink (UL) multiuser transmission for a wireless communications protocol. In some embodiments, the wireless communications protocol may be for the Institute of Electrical and Electronics Engineers (IEEE) 802.11ax standard (current proposals and/or future versions), or various other wireless communication protocols.

In some embodiments, a station receives a MU-BAR frame for a wireless communications protocol from an access point (AP). The receiving station extracts a corresponding trigger information field and a block acknowledgment request (BAR) field from the MU-BAR frame. The trigger information field may define a UL multiuser transmission for a set of stations. For example, the trigger information field may include resource block allocation information for the set of stations.

In some embodiments, the station determines a transmission mode based on its corresponding trigger information field. The station then determines one or more frames to acknowledge based on the BAR field. The BAR field may include a sequence number of the starting frame to acknowledge and a bitmap indicating data frames being solicited for acknowledgement. The station then generates a block acknowledgment (BA) frame based on the frames being solicited for acknowledgement. Thereafter, the station transmits the generated BA frame to the AP to acknowledge the data frames.

In some embodiments, the trigger information field may be included in the physical preamble field of the MU-BAR frame. In some embodiments, the trigger information field may be included in a media access control (MAC) frame portion of the MU-BAR frame. In some embodiments, the BAR field may include a BAR control field and a BAR information field.

In some embodiments, the MU-BAR frame may be a multicast frame that may be simultaneously sent to a group of stations. In some embodiments, the MU-BAR frame may include a single BAR control field and a single BAR information field that are common to two or more (e.g., all) stations receiving the multicast transmission.

In some embodiments, the MU-BAR frame may be specified as a special type of trigger frame for the IEEE 802.11ax standard (current proposals and/or future versions), or various other wireless communication protocols. The MU-BAR frame may be specified as a special type of trigger frame by defining a new control frame type for the IEEE 802.11ax standard (current proposals and/or future versions), or various other wireless communication protocols.

In some other embodiments, the MU-BAR frame may be specified as a special type of trigger frame by redefining a legacy BAR frame format for the IEEE 802.11ax standard (current proposals and/or future versions), or various other wireless communication protocols.

Other features of the present disclosure will be apparent from the accompanying drawings and from the detailed description, which follows.

BRIEF DESCRIPTION OF THE DRAWINGS

The accompanying drawings are incorporated herein and form a part of the specification.

DETAILED DESCRIPTION

Provided herein are system, apparatus, device, method and/or computer program product embodiments, and/or combinations and sub-combinations thereof, for providing multiuser block acknowledgment in a wireless communication protocol. Embodiments operate by receiving a multiuser block acknowledgement request (MU-BAR) frame from access point (AP) for a wireless communications protocol. The embodiments determine a transmission mode based on trigger information in the MU-BAR frame. Embodiments determine a set of frames being solicited for acknowledgment in the MU-BAR frame. Embodiments generate a block acknowledgment (BA) frame based on the frames being solicited for acknowledgement. Embodiments transmit the BA frame to the AP based on the determined transmission mode. Because the trigger information in the MU-BAR frame defines transmission modes for a set of stations, the set of stations can perform block acknowledgment simultaneously on the wireless channel.

Figure 1:
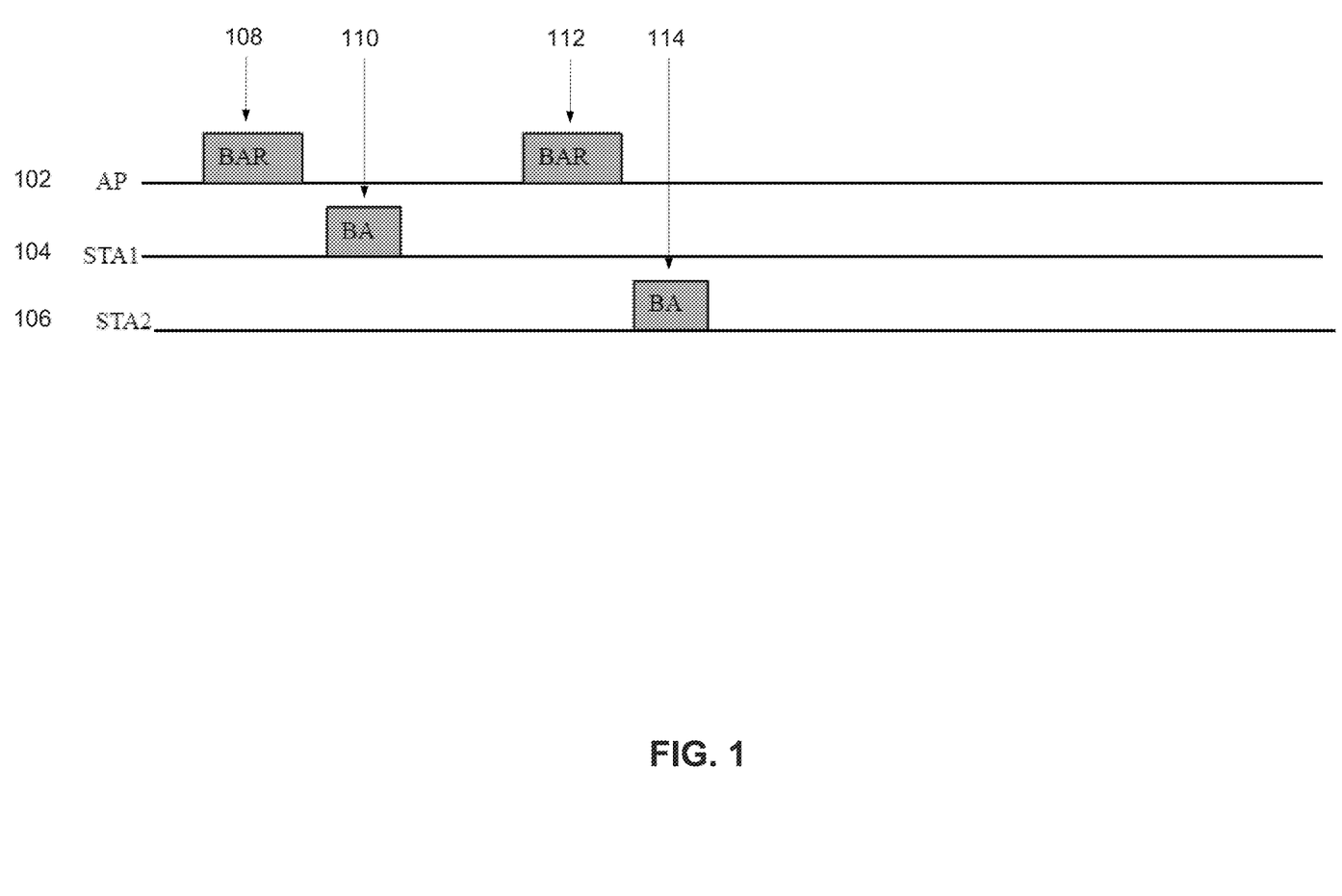
FIG. 1 is an illustration of example block acknowledgement for a wireless local area network (WLAN), according to some embodiments.

FIG. 1 is an illustration of example block acknowledgement for a wireless local area network (WLAN), according to some embodiments. For example, the WLAN may use the IEEE 802.11ax standard (current proposals and/or future versions), or various other wireless communication protocols.

FIG. 1 includes an access point 102, a station 104, and a station 106 that communicate over the WLAN. Access point 102 may be an access point (AP) that transmits and receives frames over the WLAN. Stations 104 and 106 may be any wireless communication device configured to communicate in the WLAN, such as a desktop computer, laptop computer, smart phone, smart device, or various other devices as would be appreciated by a person of ordinary skill in the art.

In some embodiments, access point 102 can connect (communicatively) station 104 to station 106 within the WLAN. Specifically, station 104 may transmit a frame to station 106 by transmitting the frame to access point 102. Access point 102 may then transmit the frame to station 106. Similarly, station 106 may transmit a frame to station 104 by transmitting the frame to access point 102. Access point 102 may then transmit the frame to station 104.

In some embodiments, stations may transmit and receive frames using block acknowledgment. Specifically, an AP may transmit a block acknowledgement request (BAR) frame to a station. In response, the station may transmit, to the AP, a single block acknowledgement (BA) frame acknowledging receipt of one or more frames. In some embodiments, a single BA frame may be solicited in any/all of uplink (UL), downlink (DL), and peer-to-peer transmissions, as well as in unicast and multicast transmissions.

For example, access point 102 may transmit BAR 108 to station 104. In response, station 104 may acknowledge receipt of one or more frames by transmitting BA 110 to access point 102.

In some embodiments, BAR 108 may solicit block acknowledgment for multiple frames from station 104. BAR 108 may include a sequence number of a starting frame being solicited for acknowledgement and a bitmap. A bit in the bitmap may represent a single data frame being solicited for acknowledgment. A sequence number for the frame being solicited for acknowledgement may be equal to the sequence number of the starting frame and the bit number.

In some embodiments, BA 110 may indicate the data frames received at station 104. Specifically, BA 110 may include a bitmap that indicates the data frames received. A bit in the bitmap may represent a receipt status of a single data frame solicited for acknowledgment. A bit value of '1' may indicate the corresponding data frame was successfully received. A bit value of '0' may indicate the corresponding data frame was not received.

Similarly, access point 102 may transmit BAR 112 to station 106. In response, station 106 may acknowledge receipt of one or more frames by transmitting BA 114 to access point 102.

In some embodiments, BAR 112 may solicit block acknowledgment for multiple data frames from station 106. BAR 112 may include a sequence number of a starting data frame being solicited for acknowledgement and a bitmap. A bit in the bitmap may represent a single data frame being solicited for acknowledgment. A sequence number for the data frame being solicited for acknowledgement may be equal to the sequence number of the starting data frame and the bit number.

In some embodiments, BA 114 may indicate the data frames received at station 106. Specifically, BA 114 may include a bitmap that indicates the data frames received. A bit in the bitmap may represent a receipt status of a single data frame solicited for acknowledgment. A bit value of '1' may indicate the corresponding data frame was successfully received. A bit value of '0' may indicate the corresponding data frame was not received.

In some embodiments, a station may transmit a BA frame when no other station uses the wireless channel. In other words, two stations may not transmit BA frames at the same time. This may create network congestion because an excessive number of BAR and BA frames may be transmitted by an access point and one or more stations.

For example, station 104 may not transmit BA 110 when station 106 is transmitting BA 114. In other words, stations 104 and 106 may need to send separate BA frames at separate times to acknowledge receipt of their frames. This may create excessive network congestion. Therefore, there is a need to solicit multiple BA frames in one UL multiuser transmission.

Figure 2:
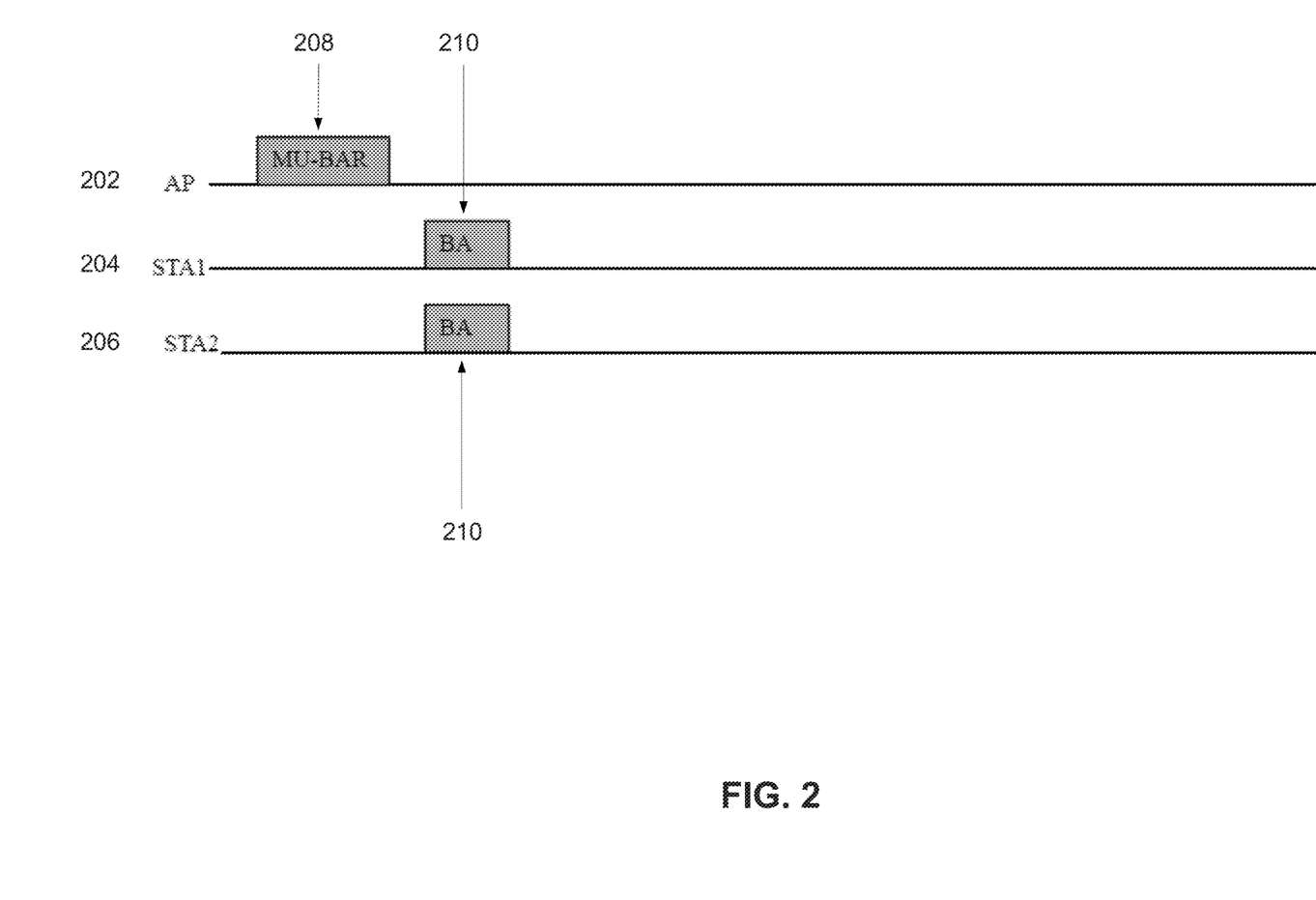
FIG. 2 is an illustration of example multiuser block acknowledgement for a WLAN, according to some embodiments.

FIG. 2 is an illustration of multiuser block acknowledgment for a WLAN, according to some embodiments. For example, in some embodiments, the WLAN may use the IEEE 802.11ax standard (current proposals and/or future versions), or various other wireless communication protocols.

FIG. 2 includes an access point 202, a station 204, and a station 206 that communicate over the WLAN. Access point 202 may be an access point (AP) that transmits and receives frames over the WLAN. Stations 204 and 206 may be any wireless communication device configured to communicate in the WLAN, such as a desktop computer, laptop computer, tablet computer, smart phone, smart device, wearable device, set-top box, or various other device as would be appreciated by a person of ordinary skill in the art.

In some embodiments, access point 202 can connect (communicatively) station 204 to station 206 within the WLAN. Specifically, station 204 may transmit a frame to station 206 by transmitting the frame to access point 202. Access point 202 may then transmit the frame to station 206. Similarly, station 206 may transmit a frame to station 204 by transmitting the frame to access point 202. Access point 202 may then transmit the frame to station 204.

In some embodiments, stations 204 and 206 may transmit and receive frames using multiuser block acknowledgment. In some embodiments, an AP may send a multiuser block acknowledgement request (MU-BAR) frame to solicit multiple BA frames from one or more stations at the same time. Specifically, a MU-BAR frame may be a DL request that solicits multiple BA frames simultaneously in an UL multiuser transmission. In some embodiments, a MU-BAR frame may be a trigger frame for a proposal having a predetermined format, e.g., a format associated with the IEEE 802.11ax standard (current proposals and/or future versions), or various other wireless communication protocols.

For example, in FIG. 2, access point 202 may transmit frames to stations 204 and 206. In order to confirm receipt of the frames, access point 202 may transmit MU-BAR 208 to stations 204 and 206. In response, stations 204 and 206 may each acknowledge receipt of the frames by substantially simultaneously transmitting BA 210 to access point 202. In some embodiments, each BA 210 may be transmitted in an UL MU-PPDU frame, e.g., in accordance with the IEEE 802.11ax standard (current proposals and/or future versions), or various other wireless communication protocols.

In some embodiments, using MU-BAR 208 may save network resources. Specifically, MU-BAR 208 may eliminate the need to utilize multiple channel access times, multiple preamble times, and multiple short interframe spaces (SIFS). In some embodiments for, e.g., nine stations communicating without collision, a savings on channel access delay and preamble time may be approximately 1.2 milliseconds for a 40 microsecond preamble. In some embodiments with a congested environment experiencing more collisions, an even greater airtime savings may be achieved.

In some embodiments, MU-BAR 208 may include a sequence number of a starting data frame being solicited for acknowledgement and a bitmap. A bit in the bitmap may represent a single data frame being solicited for acknowledgment. A sequence number for the data frame being solicited for acknowledgement may be equal to the sequence number of the starting data frame and the bit number In some embodiments, a BA 210 may indicate the data frames received at a station, e.g., stations 204 and 206. Specifically, BA 210 may include a bitmap that indicates the data frames received. The bitmap may be based on the sequence number of the starting data frame in MU-BAR 208. A bit in the bitmap may represent a receipt status of a single data frame solicited for acknowledgment. A bit value of '1' may indicate the corresponding data frame was successfully received. A bit value of '0' may indicate the corresponding data frame was not received.

In some embodiments, MU-BAR 208 may correspond to a type of trigger frame for the IEEE 802.11ax standard (current proposals and/or future versions), or various other wireless communication protocols. In other words, MU-BAR 208 may be a type of control frame, e.g., to be implemented in the IEEE 802.11ax standard (current proposals and/or future versions), or various other wireless communication protocols. MU-BAR 208 may include trigger information and BAR information for multiple stations, e.g., a set of stations. For example, MU-BAR 208 may include trigger and BAR information for stations 204 and 206. Further, the trigger information may define the UL multiuser transmission for stations 204 and 206. In some embodiments, MU-BAR 208 may include trigger information because UL BA frame transmissions using Orthogonal Frequency Division Multiple Access (OFDMA) may need resource allocation block information from the AP.

In some embodiments, the trigger information may include any/all of station identifier information, resource block allocation information, transmission power information, and/or various other transmission mode information as would be appreciated by a person of ordinary skill in the art. MU-BAR 208 also may encode the trigger information using any technique, as would be appreciated by a person of ordinary skill in the art.

Figure 3:
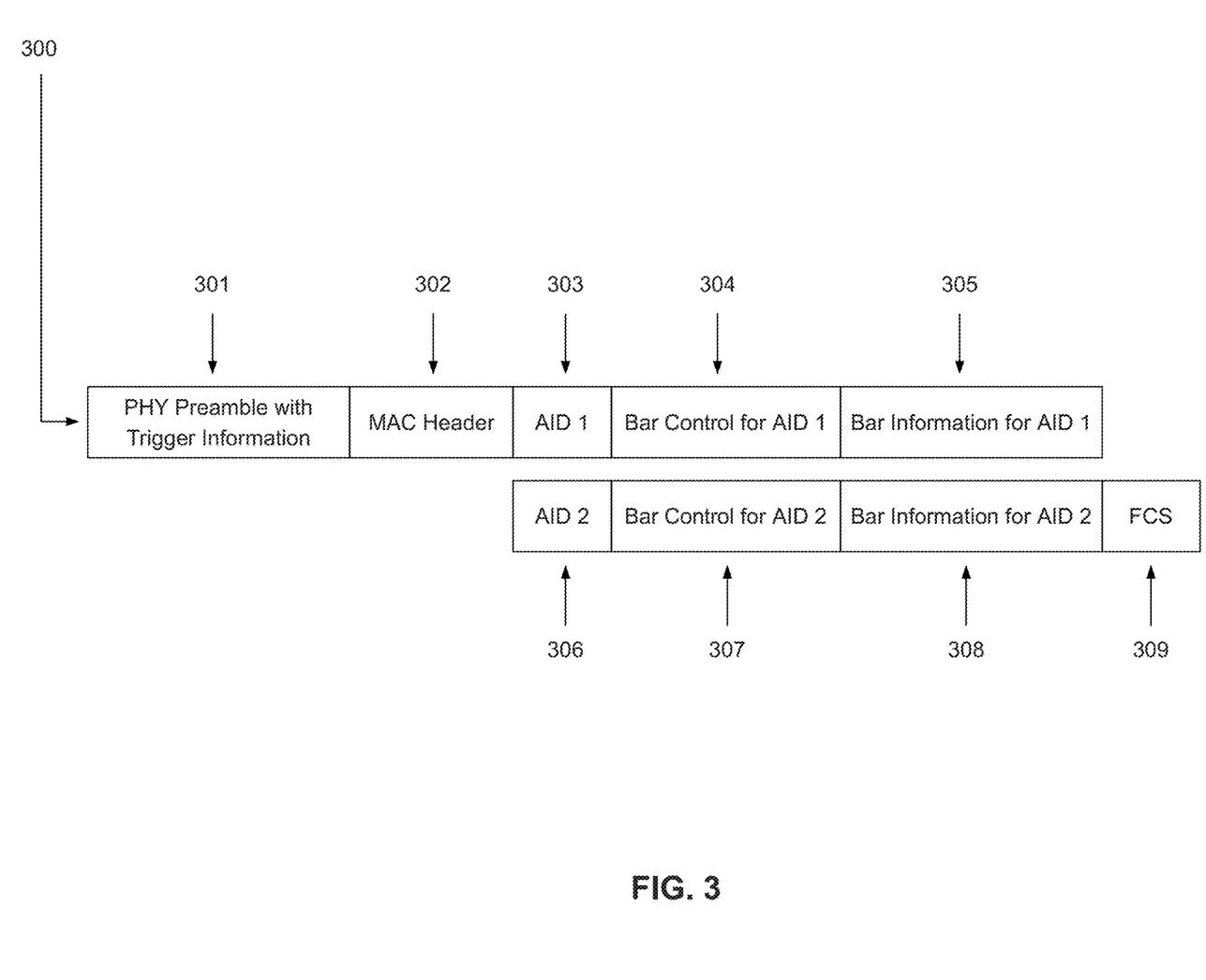
FIG. 3 is a block diagram of an example MU-BAR frame that provides trigger information through a physical preamble field, according to some embodiments.

FIG. 3 is a block diagram of an example MU-BAR frame 300 for two stations that provides trigger information through a physical preamble field, according to some embodiments. In some embodiments, MU-BAR 300 may be transmitted in accordance with a standard, such as the IEEE 802.11ax standard (current proposals and/or future versions), or various other wireless communication protocols.

In some embodiments, MU-BAR 300 includes a physical layer (PHY) preamble 301, a MAC header 302, and a frame check sequence (FCS) 309. MU-BAR frame 300 also can include trigger and BAR information for multiple stations, e.g., two stations. Specifically, MU-BAR 300 solicits BA frames from stations 1 and 2 such as, for example, stations 204 and 206 in FIG. 2.

In some embodiments, MU-BAR frame 300 may encode the BAR information using a set of fields for each station. For example, MU-BAR frame 300 may include the following fields for station 1: an association identifier (AID) 303, BAR control information 304, and BAR information 305. Similarly, MU-BAR frame 300 may include the following fields for station 2: AID 306, BAR control information 307, and BAR information 308.

In some embodiments, PHY preamble 301 may include trigger information for stations 1 and 2. The trigger information may specify how stations 1 and 2 are to simultaneously transmit multiple BA frames in one UL multiuser transmission. In some embodiments, the multiple BA frames may be transmitted inside a UL MU-PPDU frame, e.g., in accordance with a standard, such as the IEEE 802.11ax standard (current proposals and/or future versions), or various other wireless communication protocols. In some embodiments, the trigger information may include resource block allocation information (e.g., resource-unit start index and resource-unit end index), transmission power information, and various other transmission mode information as would be appreciated by a person of ordinary skill in the art.

In some embodiments, MAC header 302 may include a frame control field, a duration field, and various other fields as would be appreciated by a person of ordinary skill in the art. In some embodiments, MAC header 302 may be a MAC header associated with a standard, such as the IEEE 802.11ax standard (current proposals and/or future versions), or various other wireless communication protocols. In some embodiments, FCS 309 may be an error detecting code to detect data errors in MU-BAR 300 as would be appreciated by a person of ordinary skill in the art.

In some embodiments, AID 303, BAR control 304, and BAR information 305 may represent station identification information, BAR control information, and BAR information, respectively, for station 1 for which a BA frame is being solicited. In some embodiments, AID 303 may include a station identifier, e.g., station 1. AID 303 may be set by an AP in the WLAN, e.g., according to a standard, such as the IEEE 802.11ax standard (current proposals and/or future versions), or various other wireless communication protocols.

In some embodiments, BAR control 304 may indicate a type of BA frame being solicited: one or more of a compressed BA, a basic BA, or various other types of BA frame as would be appreciated by a person of ordinary skill in the art. BAR control 304 may include a sequence number of the starting frame being solicited for acknowledgement. In some embodiments, BAR information 305 may include a bitmap indicating the data frames being solicited for acknowledgment.

In some embodiments, AID 306, BAR control 307, and BAR information 308 may represent station identification information, BAR control information, and BAR information for a station 2 for which a BA frame is being solicited. AID 306, BAR control 307, and BAR information 308 may include similar types of information as AID 303, BAR control 304, and BAR information 305, respectively. As would be appreciated by a person of ordinary skill in the art, MU-BAR 300 may solicit additional BA frames from additional stations by including corresponding information, such as sets of AID, BAR control, and BAR information fields.

Figure 4:
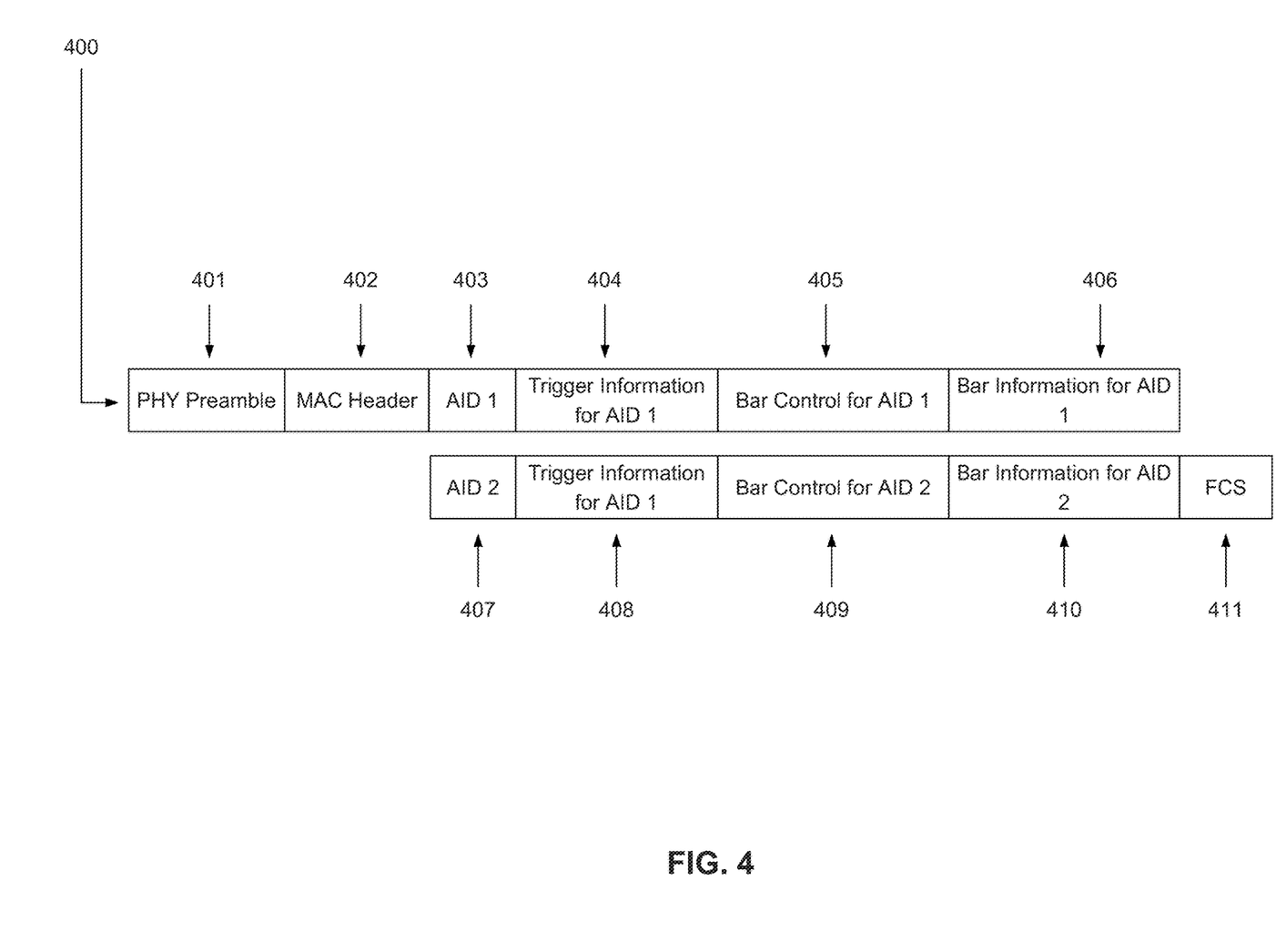
FIG. 4 is a block diagram of an example MU-BAR frame that provides trigger information through a MAC frame, according to some embodiments.

FIG. 4 is a block diagram of a MU-BAR frame 400 for two stations that provides trigger information through a MAC frame, according to some embodiments. In some embodiments, MU-BAR 400 may be transmitted in accordance with a standard, such as the IEEE 802.11ax standard (current proposals and/or future versions), or various other wireless communication protocols.

In some embodiments, MU-BAR 400 includes a PHY preamble 401, a MAC header 402, and a FCS 411. MU-BAR 400 also includes trigger and BAR information for two stations, although MU-BAR 400 also could be configured to address more than two stations. Specifically, MU-BAR 400 solicits BA frames from stations 1 and 2 such as, for example, stations 204 and 206 in FIG. 2.

In some embodiments, PHY 401 may be a PHY field that corresponds to a standard, such as the IEEE 802.11ax standard (current proposals and/or future versions), or various other wireless communication protocols. As implemented, PHY preamble 401 may not include trigger information for stations.

In some embodiments, MAC header 402 may include any/all of a frame control field, a duration field, and/or various other fields as would be appreciated by a person of ordinary skill in the art. In some embodiments, MAC header 402 may be a MAC header corresponding to a standard, such as the IEEE 802.11ax standard (current proposals and/or future versions), or various other wireless communication protocols. In some embodiments, FCS 411 may an error detecting code implemented to detect data errors in MU-BAR 400 as would be appreciated by a person of ordinary skill in the art.

In some embodiments, MU-BAR 400 solicits BA frames from two stations: stations 1 and 2. The trigger information may be included in the MAC frame portion of MU-BAR 400. Specifically, the MAC frame portion of MU-BAR 400 may include the trigger information for both stations 1 and 2.

In some embodiments, MU-BAR 400 may encode the trigger and BAR information for each station using a set of fields for each station. For example, MU-BAR 400 includes the following fields for station 1: AID 403, trigger information 404, BAR control 405, and BAR information 406. Similarly, MU-BAR 400 includes the following fields for station 2: AID 407, trigger information 408, BAR control 409, and BAR information 410.

In some embodiments, trigger information 404 may encode the trigger information for station 1. Specifically, trigger information 404 may include any/all of resource block allocation information (e.g., resource-unit start index and resource-unit end indexes), transmission power information, and/or various other transmission mode information as would be appreciated by a person of ordinary skill in the art.

In some embodiments, BAR control 405 may include a type of BA frame being solicited from station 1: such as one or more of a compressed BA, a basic BA, and/or any of various other types of BA frames, as would be appreciated by a person of ordinary skill in the art. BAR control 405 may include a sequence number of the starting frame being solicited for acknowledgement. BAR information 406 may include a bitmap indicating the data frames being solicited for acknowledgment.

Similarly, the information for station 2 may include AID 407, trigger information 408, BAR control 409, and BAR information 410. AID 407, trigger information 408, BAR control 409, and BAR information 410 may include similar types of information as AID 403, trigger information 404, BAR control 405, and BAR information 406, respectively. As would be appreciated by a person of ordinary skill in the art, MU-BAR 400 may solicit additional BA frames from additional stations by including additional respective fields, such as AID, trigger information, BAR control, and BAR information fields.

In some embodiments, the encoding of trigger information in a MU-BAR frame can be simplified. This is because a data frame being polled may be the only BA with the same length from two or more (e.g., all) stations. As a result, the stations receiving the MU-BAR frame may assume equal bandwidth allocation, and, therefore, the trigger information may not need to include transmission mode information, e.g., resource block allocation information. In some embodiments, a rule may be defined if the bandwidth is unable to be equally divided among the stations. Because the rule may be known to each of (e.g., all) the stations being polled, the stations may independently derive transmission mode information. As a result, the trigger information in the MU-BAR frame may not need to include such transmission mode information.

In some embodiments, a MU-BAR frame may be used whenever an access point wants to poll multiple stations for their respective unicast data reception. However, a MU-BAR frame may also be used for reliable multicast data transmission, e.g., to poll multiple stations for their respective multicast data reception.

In some embodiments, group case reliability block acknowledgement (GCR-BA), e.g., for the IEEE 802.11ax standard (current proposals and/or future versions), may allow an AP to solicit a BA frame from a station to improve the reliability of a multicast transmission. However, in GCR-BA, the AP may be able to solicit only a small number of BA frames (e.g., 1 BA frame) from a station. As a result, multicast data delivery may be delayed, incur more overhead, or be less reliable.

In some embodiments, a MU-BAR frame may allow an AP to poll multiple stations simultaneously for block acknowledgment. In other words, a MU-BAR frame may trigger an UL multiuser BA. This may provide reliable multicast transmission without degrading data delivery latency.

Figure 5:
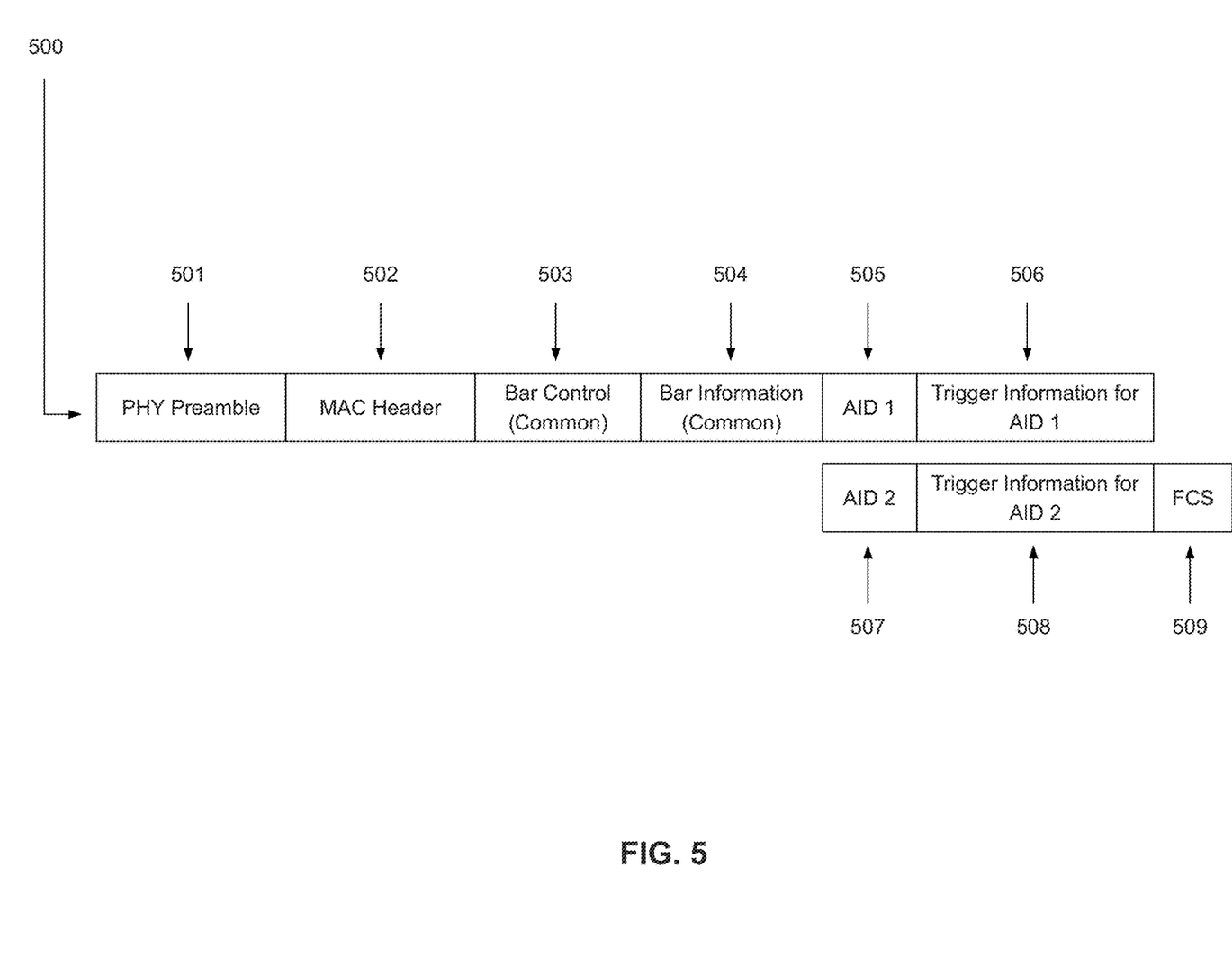
FIG. 5 is a block diagram of an example MU-BAR frame for multicast transmission, according to some embodiments.

FIG. 5 is a block diagram of an example MU-BAR frame 500 for multicast transmission to two stations, according to example embodiments. In some embodiments, MU-BAR 500 may be transmitted in accordance with a standard, such as the IEEE 802.11ax standard (current proposals and/or future versions), or various other wireless communication protocols.

In some embodiments, MU-BAR 500 includes a PHY preamble 501, a MAC header 502, and frame check sequence (FCS) 509. MU-BAR frame 500 also includes trigger and BAR information for multiple stations, e.g., two stations as shown. In other words, MU-BAR 500 can solicit BA frames from stations 1 and 2 (e.g., stations 204 and 206 in FIG. 2) during a multicast transmission.

In some embodiments, PHY preamble 501 may be a PHY preamble field corresponding to a standard, such as the IEEE 802.11ax standard (current proposals and/or future versions), or various other wireless communication protocols. MAC header 502 may also be a MAC header corresponding to a standard, such as the IEEE 802.11ax standard (current proposals and/or future versions), or various other wireless communication protocols. MAC header 502 may include any/all of a frame control field, a duration field, and/or various other fields, as would be appreciated by a person of ordinary skill in the art.

In some embodiments, PHY preamble 501 may include trigger information for stations in the multicast transmission. In some embodiments, the MAC frame portion of MU-BAR 500 may include trigger information for stations in the multicast transmission. Specifically, the MAC frame portion of MU-BAR 500 may include the trigger information for both stations 1 and 2.

In some embodiments, MU-BAR 500 may be simplified compared to MU-BAR frame 300 or MU-BAR frame 400. This is because MU-BAR 500 is a multicast frame that may be sent to a group of stations at once. Thus, the requested block acknowledgment format and frame sequence numbering may be the same for two or more (e.g., all) stations. Specifically, BAR control and BAR information that is common to two or more (e.g., all) the stations may be provided prior to station specific information in MU-BAR 500.

In some embodiments, MU-BAR 500 includes BAR control 503 and BAR information 504 fields. BAR control 503 and BAR information 504 fields are common to two or more (e.g., all) stations receiving the multicast, e.g, stations 1 and 2 according to some embodiments. Accordingly, BAR control 503 and BAR information 504 may be provided prior to AID 505, trigger information 506, AID 507, and trigger information 508. Further, FCS 509 may be an error detecting code to detect data errors in MU-BAR 500 as would be appreciated by a person of ordinary skill in the art.

In some embodiments, BAR control 503 may include a type of BA frame being solicited for acknowledgement that is common to two or more (e.g., all) stations receiving the multicast. BAR control 503 may include a sequence number for a starting data frame being solicited for acknowledgement that is common to two or more (e.g., all) stations receiving the multicast. Similarly, BAR information 504 may include a bitmap indicating the data frames being solicited for acknowledgment that is common to all stations receiving the multicast.

In FIG. 5, MU-BAR 500 includes two sets of station specific fields for the two stations receiving the multicast, e.g., stations 1 and 2. In some embodiments, MU-BAR frame 500 may include AID 505 and trigger information 506 for station 1. MU-BAR frame 500 may include AID 507 and trigger information 508 for station 2.

In some embodiments, AID 505 may include a station identifier, e.g., station 1. AID 505 may be set by an AP in the WLAN, e.g., according to a standard, such as the IEEE 802.11ax standard (current proposals and/or future versions), or various other wireless communication protocols. Trigger information 506 may include trigger information (e.g., resource block allocation information) for station 1. Similarly, AID 507 may include a station identifier, e.g., station 2. Trigger information 508 may include trigger information (e.g., resource block allocation information) for station 2. As would be appreciated by a person of ordinary skill in the art, MU-BAR 500 may solicit additional BA frames from additional stations by including, e.g., additional sets of AID and trigger information fields.

In some embodiments, a MU-BAR frame may be specified as a special type of trigger frame for a standard, such as the IEEE 802.11ax standard (current proposals and/or future versions), or various other wireless communication protocols. A MU-BAR frame may be specified as a special type of trigger frame by defining a new control frame type for a standard, such as the IEEE 802.11ax standard (current proposals and/or future versions), or various other wireless communication protocols. Specifically, the new control frame type may be encoded using the reserved bits of a type field inside a frame control field in the MAC header of the MU-BAR frame.

In some embodiments, a MU-BAR frame may be specified as a special type of trigger frame, e.g., by defining a new frame type for a standard, such as the IEEE 802.11ax standard (current proposals and/or future versions), or various other wireless communication protocols. Specifically, according to some embodiments, the new frame type may be encoded using reserved bits 14 and 15 of the duration/identifier field of a frame control field in the MAC header of the MU-BAR frame.

In some embodiments, a MU-BAR frame may be specified as a special type of trigger frame, e.g., by redefining a legacy BAR frame format for a standard, such as the IEEE 802.11ax standard (current proposals and/or future versions), or various other wireless communication protocols. Specifically, according to some embodiments, the MU-BAR frame may be specified as a special type of trigger frame using reserved bit combinations in a legacy BAR frame field. In some other embodiments, the MU-BAR frame may be specified as a special type of trigger frame using one or more of the reserved bits (e.g., one or more of bits B3-B11) in the legacy BAR frame field.

Figure 6:
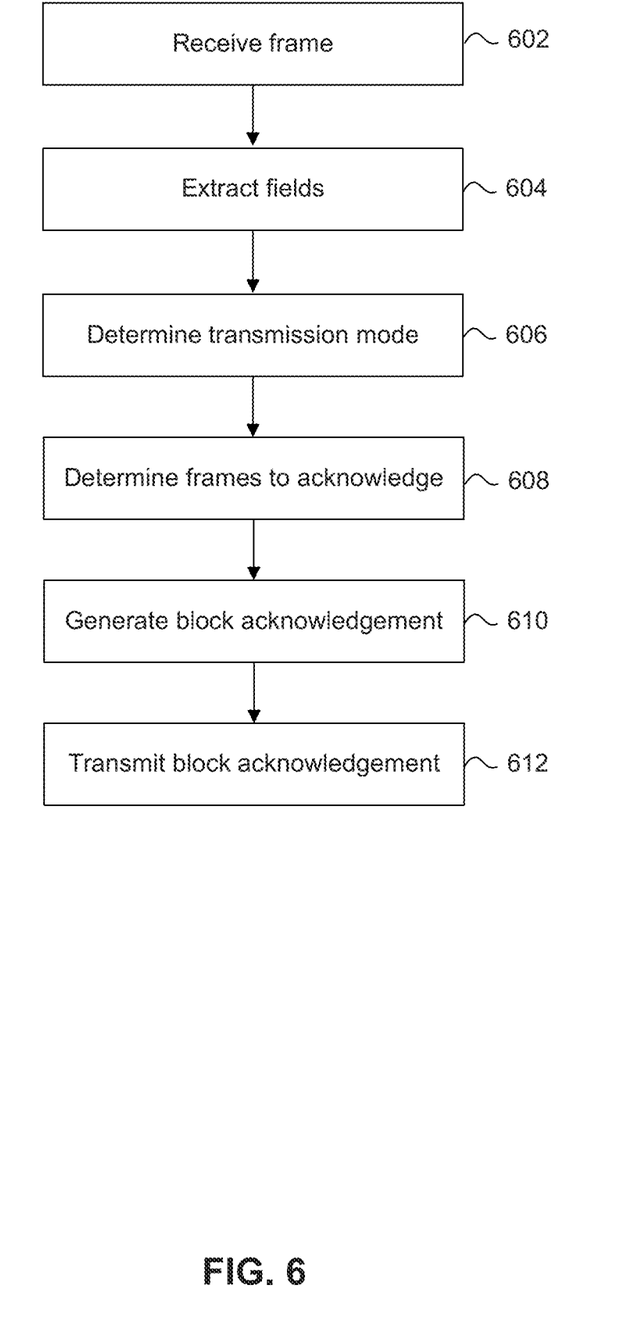
FIG. 6 is a flowchart illustrating an example of performing multiuser block acknowledgment, according to some embodiments.

FIG. 6 is a flowchart for an example method 600 for multiuser block acknowledgement, according to some embodiments. Method 600 can be performed by processing logic that can include hardware (e.g., circuitry, dedicated logic, programmable logic, microcode, etc.), software (e.g., instructions executing on a processing device), or a combination thereof. For example, method 600 can be performed by station 204 and/or station 206 in FIG. 2.

In 602, a station receives a MU-BAR frame (for a wireless communication protocol) from an AP, requesting multiuser block acknowledgment. The wireless communications protocol may correspond to a standard, such as the IEEE 802.11ax standard (current proposals and/or future versions), or various other wireless communication protocols. The MU-BAR frame may a be a special type of trigger frame, e.g., a trigger frame corresponding to a standard, such as the IEEE 802.11ax standard (current proposals and/or future versions), or various other wireless communication protocols. The MU-BAR may frame include one or more trigger information fields and one or more BAR fields. A trigger information field may indicate an UL transmission mode for a station. A BAR field may indicate one or more frames being solicited for acknowledgment from a station.

In 604, the station extracts its corresponding trigger information field(s) and BAR field(s) from the MU-BAR frame. In some embodiments, the station may extract its corresponding trigger information field(s) and BAR information field(s) based on a station identifier associated with the station. In some embodiments, the trigger information field(s) may be included in a PHY preamble field in the MU-BAR frame. In some other embodiments, the trigger information field may be included in a MAC frame portion of the MU-BAR frame.

In some embodiments, a BAR field may include a BAR control field and a BAR information field. In some embodiments, the MU-BAR frame may include a single BAR control field and a single BAR information field for two or more (e.g., all) stations in a multicast transmission. In some embodiments, the single BAR control field and the single BAR information field may precede to a set of station specific fields in the MU-BAR frame.

In 606, the station determines a transmission mode based on its corresponding trigger information field. In some embodiments, the trigger information field may include any/all of resource block allocation information, transmission power information, and/or various other transmission mode information as would be appreciated by a person of ordinary skill in the art.

In 608, the station determines, from the BAR field, data frames being solicited for acknowledgement. In some embodiments, a data frame may be a MAC Protocol Data Unit (MPDU) corresponding to a standard, such as the IEEE 802.11ax standard (current proposals and/or future versions), or various other wireless communication protocols. In some embodiments, the BAR field may include a BAR control field and a BAR information field. The BAR control field may include a type of BA frame being solicited from the station. The BAR control field may include a sequence number of the starting frame being solicited for acknowledgement.

The BAR information field may include a bitmap indicating the data frames being solicited for acknowledgement. A bit in the bitmap represents a single data frame being solicited for acknowledgment. A sequence number of the data frame being solicited for acknowledgement may be equal to the sequence number of the starting data frame and the bit number.

In 610, the station generates a BA frame for the data frames being solicited for acknowledgment in 608. In some embodiments, the BA frame may be a frame according to a standard, such as the IEEE 802.11ax standard (current proposals and/or future versions), or various other wireless communication protocols. In some embodiments, the BA frame may include a bitmap indicating the status of the data frames being solicited for acknowledgment. The bitmap may be based on the sequence number of the starting data frame in the BAR field in the MU-BAR frame. A bit in the bitmap may represent a receipt status of a single data frame solicited for acknowledgment. A bit value of '1' may indicate the corresponding data frame was successfully received. A bit value of '0' may indicate the corresponding data frame was not received.

In 612, the station transmits the generated BA frame to the AP requesting block acknowledgment, in accordance with the transmission mode determined in 606.

Figure 7:
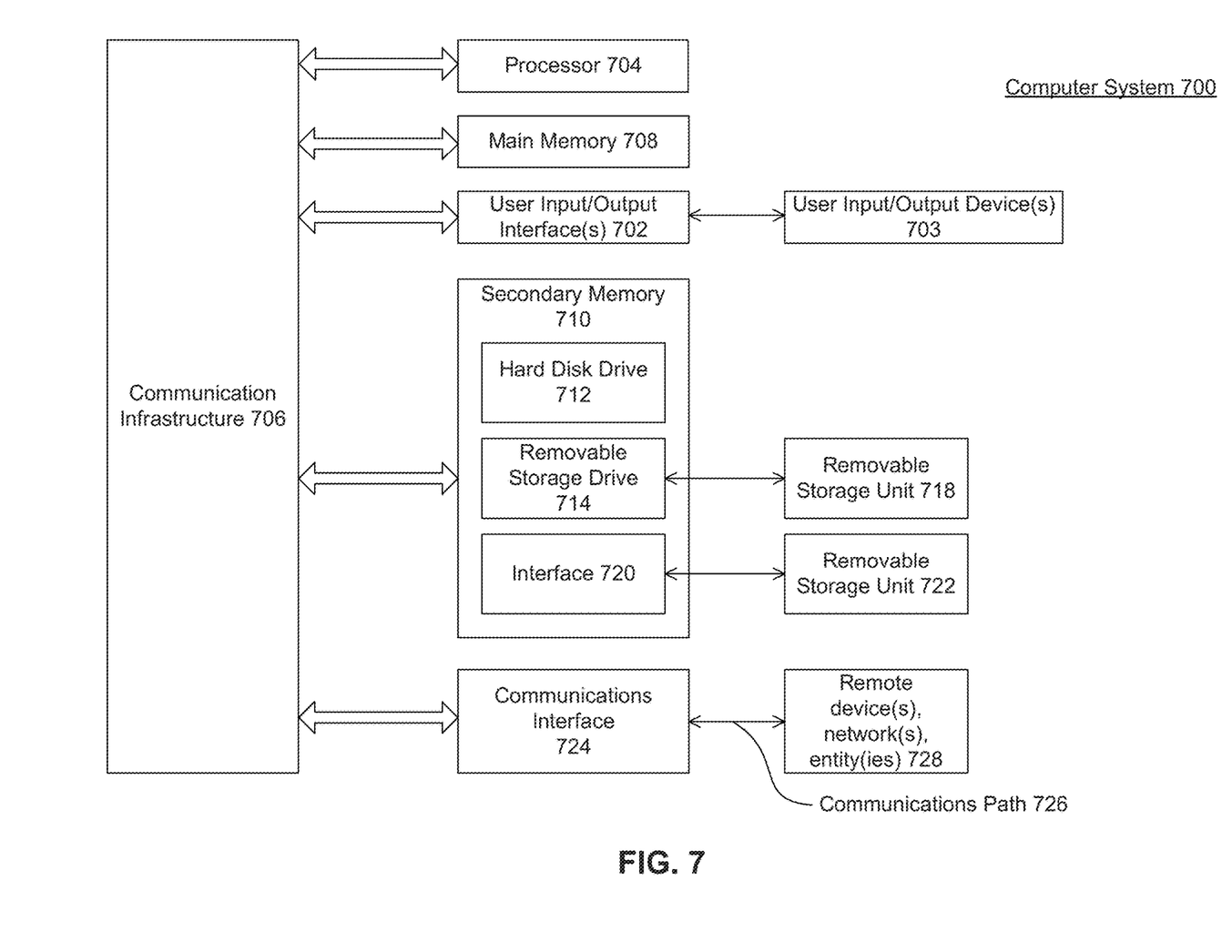
FIG. 7 is an example computer system for implementing various embodiments.

Various embodiments can be implemented, for example, using one or more computer systems, such as computer system 700 shown in FIG. 7. Computer system 700 can be used, for example, to implement method 600 of FIG. 6. For example, computer system 700 can determine a transmission mode using trigger information. Computer system 700 can further determine a frame to acknowledge based on BAR information, according to some embodiments. Computer system 700 can be any computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to embodiments, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In embodiments, a tangible apparatus or article of manufacture including a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the disclosure herein using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method for performing block acknowledgement, comprising:
   receiving, by at least one processor, a multiuser block acknowledge request (MU-BAR) frame from an access point (AP), wherein the MU-BAR frame includes a first trigger information field, a second trigger information field, a first block acknowledgement request (BAR) information field, and a second BAR information field, and wherein the first trigger information field and the second trigger information field are included in a media access control (MAC) header of the MU-BAR frame, the first trigger information field specifies trigger information for a first station, and the second trigger information field specifies trigger information for a second station;
   determining, by the at least one processor, a transmission mode based at least in part on the first trigger information field in the MAC header of the MU-BAR frame;
   determining, by the at least one processor, a data frame to acknowledge based at least in part on a bitmap in the first BAR information field, wherein the bitmap specifies one or more data frames being solicited for acknowledgement from the AP;
   generating, by the at least one processor, a block acknowledgment (BA) frame based at least in part on the determined data frame to acknowledge; and
   transmitting the BA frame to the AP based at least in part on the determined transmission mode, wherein the BA frame is transmitted at a time when at least one other station is scheduled to transmit a different BA frame.

2. The method of claim 1, further comprising:
   extracting, by the at least one processor, the first trigger information field and the first BAR information field based at least in part on a station identifier.

3. The method of claim 1, wherein the MU-BAR frame comprises a trigger frame.

4. The method of claim 1, wherein the transmission mode is based at least in part on a spatial domain and a frequency domain.

5. The method of claim 1, wherein the MU-BAR frame is specified as a standard compliant trigger frame type in a frame control field in the MU-BAR frame.

6. The method of claim 1, wherein the MU-BAR frame is specified as a standard compliant trigger frame in a legacy BAR frame field in the MU-BAR frame.

7. The method of claim 1, wherein the first trigger information field specifies an uplink (UL) multiuser transmission for the first station.

8. The method of claim 7, wherein the first trigger information field specifies resource block allocation information for the first station.

9. A system, comprising:
   a memory; and
   at least one processor coupled to the memory and configured to:
      receive a multiuser block acknowledge request (MU-BAR) frame from an access point (AP), wherein the MU-BAR frame includes a first trigger information field, a second trigger information field, a first block acknowledgement request (BAR) information field, and a second BAR information field, and wherein the first trigger information field and the second trigger information field are included in a media access control (MAC) header of the MU-BAR frame, the first trigger information field specifies trigger information for the system, and the second trigger information field specifies trigger info illation for another system;
determine a transmission mode based at least in part on the first trigger information field in the MAC header of the MU-BAR frame;
determine a data frame to acknowledge based at least in part on a first bitmap in the first BAR information field, wherein the first bitmap specifies one or more data frames being solicited for acknowledgement from the AP;
generate a block acknowledgment (BA) frame based at least in part on the determined data frame to acknowledge; and
transmit the BA frame to the AP based at least in part on the determined transmission mode, wherein the BA frame is transmitted at a time when at least one other station is scheduled to transmit a different BA frame.

10. The system of claim 9, wherein the at least one processor is further configured to:
extract the first trigger information field and the first BAR information field based at least in part on a station identifier for the system.

11. The system of claim 9, wherein the at least one processor is further configured to:
generate a second bitmap based at least in part on the determined data frame to acknowledge.

12. The system of claim 9, wherein the transmission mode is based at least in part on a spatial domain and a frequency domain.

13. The system of claim 9, wherein the MU-BAR frame is specified as a standard compliant trigger frame in a frame control field in the MU-BAR frame or a legacy BAR frame field in the MU-BAR frame.

14. A tangible computer-readable device having instructions stored thereon that, when executed by at least one computing device, cause the at least one computing device to perform operations comprising:
transmitting a multiuser block acknowledge request (MU-BAR) frame, wherein the MU-BAR frame includes a first trigger information field, a second trigger information field, a first block acknowledgement request (BAR) information field, and a second BAR information field, and wherein the first trigger information field and the second trigger information field are included in a media access control (MAC) header of the MU-BAR frame, the first trigger information field specifies trigger information for a first station, the second trigger information field specifies trigger information for a second station, the first BAR information field includes a first bitmap specifying one or more data frames being solicited for acknowledgement from the first station, and the second BAR information field includes a second bitmap specifying one or more data frames being solicited for acknowledgement from the second station; and
in response to the transmitting, receiving a block acknowledgment (BA) frame, wherein the BA frame is received from the first station based at least in part on the first trigger information field in the MAC header of the MU-BAR frame, the BA frame indicates an acknowledgement status for at least one data frame, and the BA frame is received at a time when a different BA frame is received from at least one other station.

15. The computer-readable device of claim 14, wherein the different BA frame is received from the at least one other station based at least in part on the first trigger information field.

16. The computer-readable device of claim 14, wherein a third bitmap in the BA frame indicates the acknowledgement status for the at least one data frame.

17. The computer-readable device of claim 14, wherein the MU-BAR frame is specified as a standard compliant trigger frame type in a frame control field the MU-BAR frame or in a legacy BAR frame field in the MU-BAR frame.

18. The computer-readable device of claim 14, wherein the first station extracts the first trigger information field and the first BAR information field based at least in part on a station identifier corresponding to the first station.

* * * * *

UNITED STATES PATENT AND TRADEMARK OFFICE
CERTIFICATE OF CORRECTION

PATENT NO. : 10,615,918 B2
APPLICATION NO. : 15/203646
DATED : April 7, 2020
INVENTOR(S) : Li et al.

It is certified that error appears in the above-identified patent and that said Letters Patent is hereby corrected as shown below:

In the Claims

Claim 9, Column 15, Line 2, "trigger info illation for" should read --trigger information for--.

Signed and Sealed this
Fourth Day of August, 2020

Andrei Iancu
*Director of the United States Patent and Trademark Office*